Figure 1:
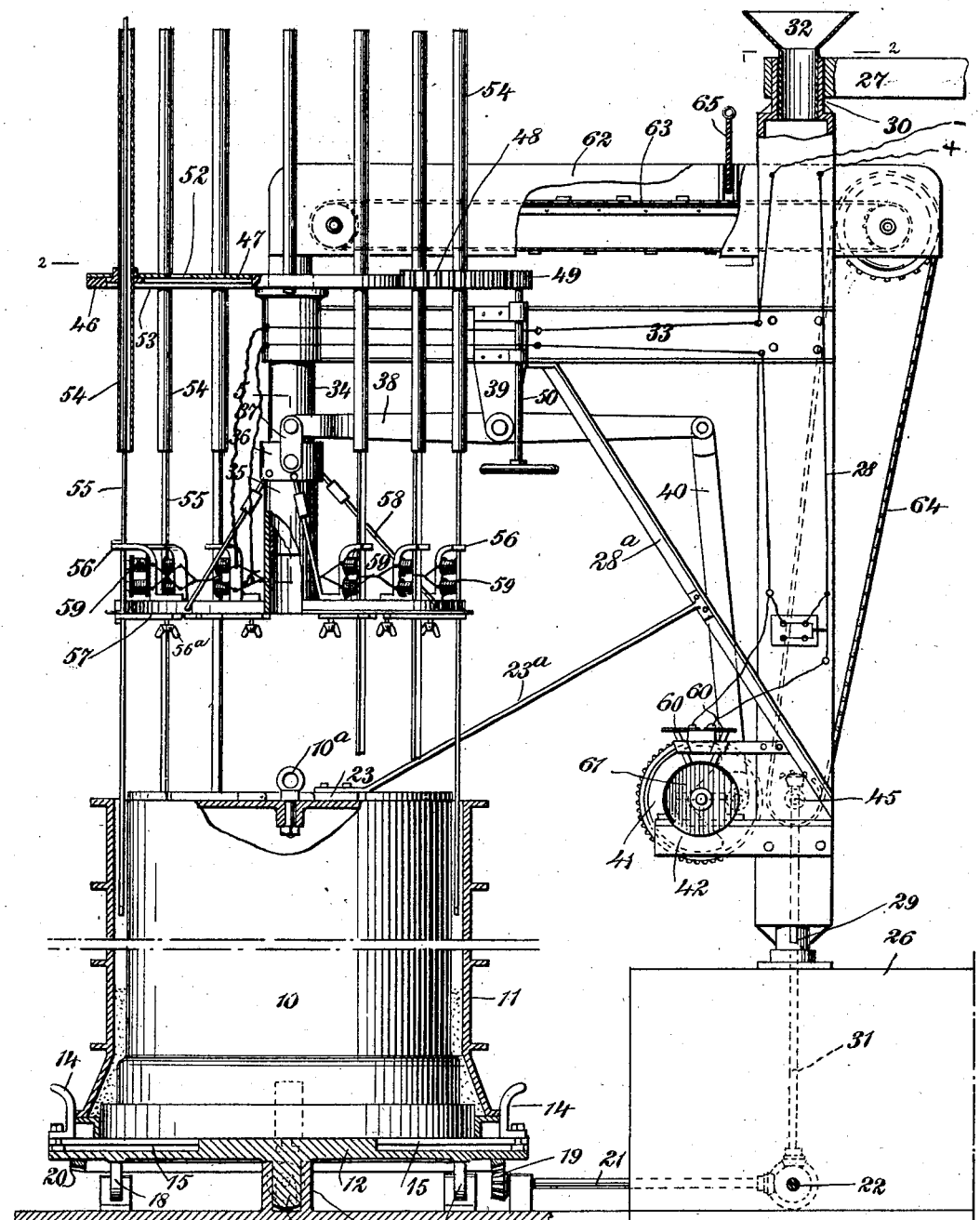

No. 718,254. PATENTED JAN. 13, 1903.
J. INGHAM, J. POULSON & J. W. MOORE.
MACHINE FOR MAKING PIPE MOLDS.
APPLICATION FILED JAN. 29, 1902.
NO MODEL. 4 SHEETS—SHEET 1.

WITNESSES:

INVENTORS
James Ingham
Joseph Poulson
John W. Moore
BY
ATTORNEYS

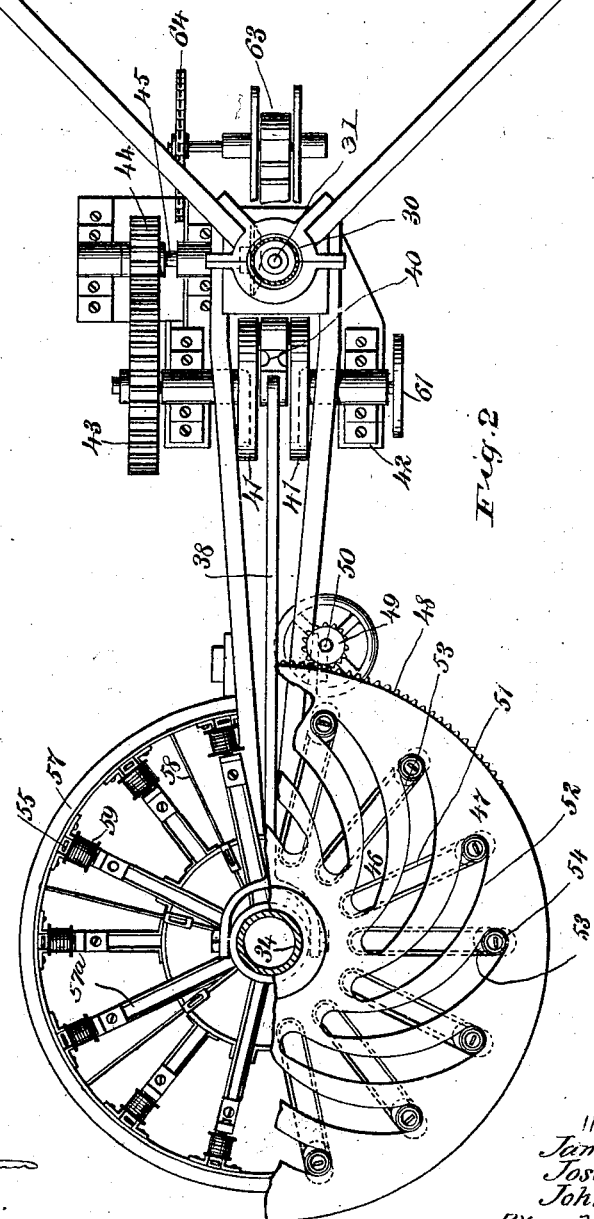

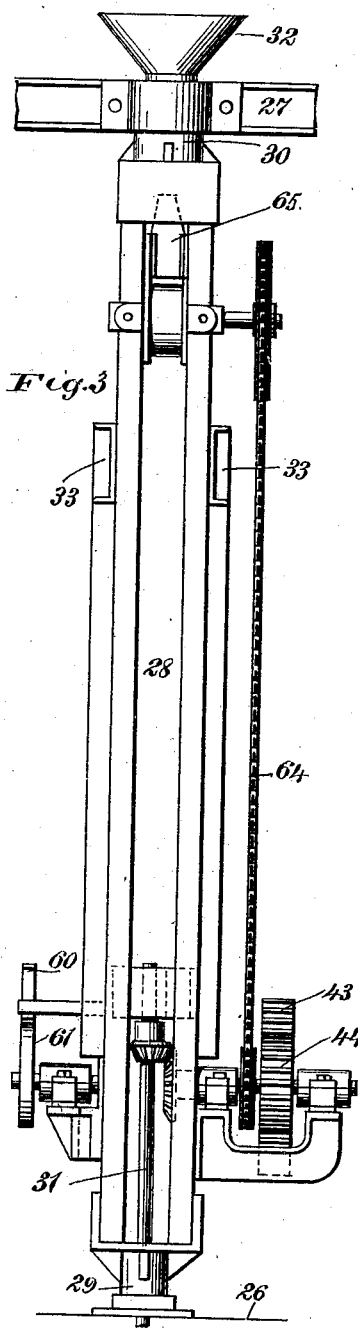
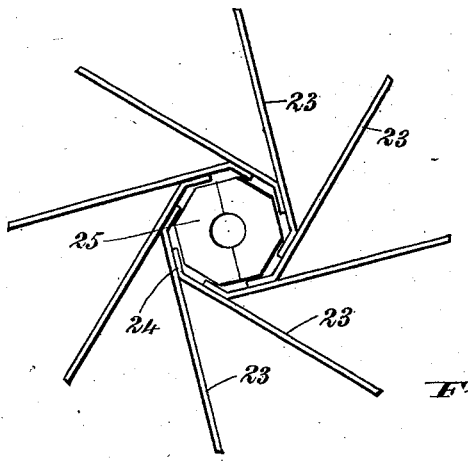
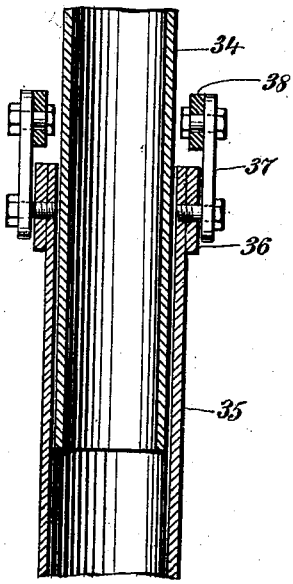

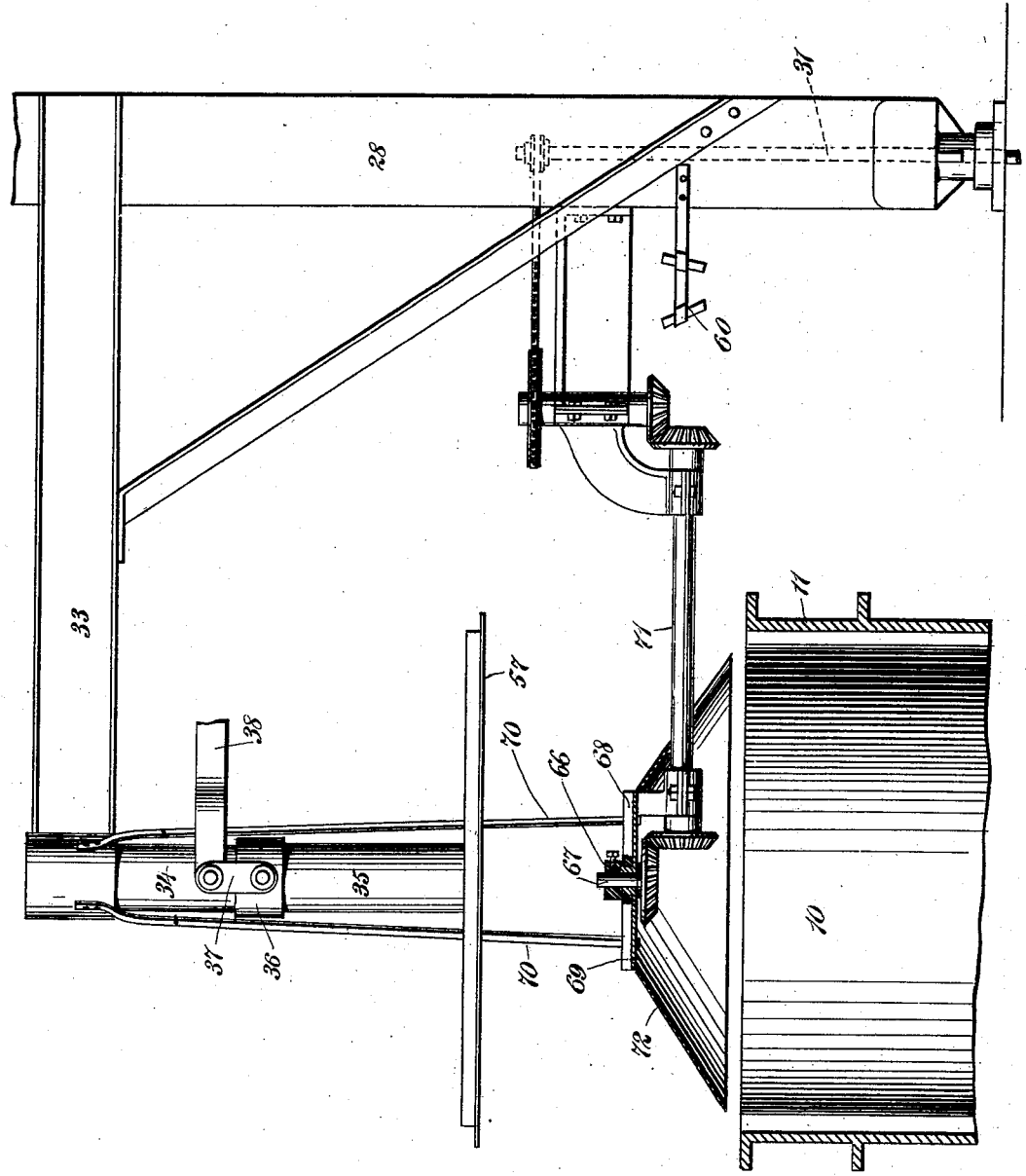

UNITED STATES PATENT OFFICE.

JAMES INGHAM, JOSEPH POULSON, AND JOHN W. MOORE, OF PHILLIPSBURG, NEW JERSEY, ASSIGNORS TO WARREN FOUNDRY AND MACHINE COMPANY, OF PHILLIPSBURG, NEW JERSEY, A CORPORATION OF NEW JERSEY.

MACHINE FOR MAKING PIPE-MOLDS.

SPECIFICATION forming part of Letters Patent No. 718,254, dated January 13, 1903.

Application filed January 29, 1902. Serial No. 91,768. (No model.)

*To all whom it may concern:*

Be it known that we, JAMES INGHAM, JOSEPH POULSON, and JOHN W. MOORE, citizens of the United States, and all residents of Phillipsburg, in the county of Warren and State of New Jersey, have invented a new and Improved Machine for Making Pipe-Molds, of which the following is a full, clear, and exact description.

This invention relates to a machine for making pipe-molds of plastic material, such as sand combined with a suitable adhesive substance; and it involves a vertically-disposed flask and pattern with a number of stamps arranged to work between them.

The present invention relates to various improvements, particularly in the manner of feeding the material and of driving the stamps.

This specification is a specific description of two forms of the invention, while the claims are definitions of the actual scope thereof.

Reference is to be had to the accompanying drawings, forming a part of this specification, in which similar characters of reference indicate corresponding parts in all the views.

Figure 1 is a side elevation of the machine with parts broken away and in section. Fig. 2 is a sectional plan on the line 2 2 of Fig. 1. Fig. 3 is a rear elevation of the derrick. Fig. 4 is a plan view of the distributer. Fig. 5 is a detail section on the line 5 5 of Fig. 1, and Fig. 6 is a sectional elevation of a modified form of the invention.

The fixtures in which the pipe-mold is formed comprise a pattern 10 and an outer wall or flask 11, these being mounted on the table 12 and may be adjusted to proper position by abutments 14, which are themselves adjustable radially in the slots 15 in the table. The table 12 may be either rotary or oscillatory; but in the present instance (see Fig. 1) it is shown as rotary, 16 indicating a central pivot turning in a socket 17 in the base of the apparatus.

18 indicates carrying-wheels, on which the table 12 is mounted, and 19 indicates a bevel-gear running on an inverted crown-wheel 20 on the table 12, whereby to impart rotary movement to the table. The gear 19 is carried on a shaft 21, which is geared with the primary movement or drive shaft 22. (See Fig. 1.) On top of the pattern 10 is the distributer for the sand or other material used to form the mold. This distributer is formed of a number of tangential arms 23, fastened to a central part or hub 24. These arms 23 sit loosely on top of the pattern 10, and the hub 24 carries a sectional block 25, which loosely encircles the neck of an eyebolt 10$^a$ on the pattern. (See Fig. 1.)

23$^a$ indicates an arm fastened to the distributer to hold it stationary, and this arm is itself carried by a part 28$^a$ of the derrick to be hereinafter described. The sand is fed down on top of the pattern, and as the pattern turns it causes the sand to work along the arms 23 and to be thereby fed between the pattern and flask.

Erected between a suitable support 26 and a sustaining-bracket 27 is a vertically-turning derrick 28, which has a hollow trunnion 29 at its bottom and a similar trunnion 30 at its top. Through the hollow trunnion 29 passes vertically a shaft 31, which is geared with the shaft 22 and extends up into the derrick 28, for a purpose which will be hereinafter described.

32 indicates a hopper, the mouth of which passes through the hollow trunnion 30, and into this hopper the material for forming the mold is charged. The device for carrying the material to the mold will be hereinafter described.

33 indicates a horizontal arm projecting out from the derrick 28 and carrying rigidly a vertical pipe 34. Mounted to slide on this pipe is a pipe 35, provided with a collar 36, to which are connected links 37, these links being joined to the forked end of a lever 38. The lever 38 is fulcrumed on a bracket 39, fastened to the arm 33, and this lever is driven by a link 40, extending downward and connected with crank-disks 41, which are mounted in arms 42, projecting out from the lower portion of the derrick 28. The shaft of one of the disks 41 is provided (see Fig. 2) with a spur-gear 43, and this gear is in mesh with a gear 44 on a shaft 45, which is geared with the shaft 31, before described. This mechanism imparts a vertically-reciprocating movement to the pipe 35, causing it to slide on the pipe-section 34. The pipe-section 34 extends above and below the arm 33 and carries fast a disk 46. Over this disk is arranged a disk 47, which is adapted to be turned around the axis of the pipe-section 34 and provided with gear-teeth 48, meshed with a pinion 49 on a hand-shaft 50. The hand-shaft 50 is mounted vertically alongside the arm 33, and by turning this shaft the disk 47 may be adjusted on the disk 46. The disk 46 is formed with radial slots 51 therein, and the disk 47 is formed with arc-shaped slots 52 therein, these arc-shaped slots being one for each slot 51. The slots 51 have blocks 53 fitted to slide therein, and through these blocks extend rigid guide-tubes 54, these tubes passing through bosses formed on the blocks 53 and these bosses lying snugly in the slots 52. When, therefore, the disk 47 is adjusted around the axis of the pipe-section 34, the blocks 53, with their attached guide-tubes 54, are moved in and out along the slots 51 through the action of the arc-shaped walls of the slots 52. This allows the tubes 54 to be adjusted to the size of the mold to be formed. Fitted closely within the guide-tubes 54 are the stamps 55, which extend downward into the flask between the core 10 and the outer wall 11. These stamps 55 extend loosely through guide-brackets 56, mounted radially adjustable on a disk 57, carried by the lower end of the pipe-section 35 and braced thereon by means of rods 58.

56ª indicates screws for adjusting the brackets 56, such screws passing through radial slots 57ª in the disk. (See Fig. 2.) The brackets 56 also carry electromagnets 59 and may be moved in or out with the magnets to accommodate the position of the stamps. These magnets are connected with brushes 60, which run on a make-and-break switch 61, connected with the crank-disks 41, before described. By means of this switch the magnets 59 are alternately energized and deënergized. Wires from a suitable source of electric energy are connected with the magnets, the electrical connections being shown in Fig. 1.

Carried by the derrick 28 and running horizontally over the arm 33 thereof is a conveyer-box 62, in which is located a horizontal endless conveyer 63. This conveyer passes under the hopper 32 and is driven by a chain 64, passing around a sprocket-wheel on the shaft 45, before described. The conveyer 63 carries the sand or other material to and dumps it into the pipe-section 34, from whence it passes through the pipe-section 35 down onto the distributer-section 23. 65 indicates a gate which is mounted on the box or casing 62 and which may be adjusted vertically over the upper run of the carrier 63, whereby to regulate the material passing into the tube 34.

In the use of the invention the sand or the mixture thereof which is used to form the mold is charged into the hopper 32, from which it flows out on the conveyer 63, this conveyer dumping it into the distributer 23, which finally discharges it into the flask. The regular rotation of the crank-disks 41 imparts a rocking movement to the lever 38 and a consequently vertical reciprocation to the tube-section 35 and disk or frame 57. The make-and-break switch 61 works in unison with these parts, and as the disk 57, with the magnets 59, reaches its lowermost position the magnets are energized, thus attracting the metallic stamps 55. As the disk 57 rises the magnets lift with them the attracted stamps, and when the disk 57 reaches its uppermost position the magnets are deënergized, thus allowing the stamps to fall. By these means the stamps are dropped regularly into the flask and are caused to pack down the material therein, thus making a compact mass of the same. Meanwhile the table 12, with the flask and pattern, is turning continuously, so that the packing of the stamps is uniform. It will be observed that the stamps are automatically adjusted to the continually-rising height of the material in the flask, and in this connection it should be explained that the tubes 54 should be of such length that the stamps are never disengaged therefrom.

Fig. 6 shows an arrangement in which the flask or pattern is made to oscillate around a vertical axis, and in this case the distributer is caused to be rotated so that the material worked will be properly distributed into the flask. In Fig. 6, 66 indicates a hub fastened to a shaft 67 and carrying arms 68, which are similar to and take the place of the arms 23, before described. These arms 68 work over a horizontal disk 69, which is rigidly supported by hangers 70 from the arm 33, before described. The shaft 67 is geared with a shaft 71, arranged horizontally, and this shaft in turn is driven by suitable gearing from the shaft 31, before described. 72 indicates a frusto-conical deflector, which is arranged directly under the disk 69 and which slants outward to the outer periphery of the pattern 10. The material forming the mold falls through the pipe-sections 34 and 35 onto the disk 69, from which it is swept by the arms 68, and it then slides over the deflector 72 and falls into the flask. In other respects the operation of this form of the invention is the same as that previously described.

Having thus described our invention, we claim as new and desire to secure by Letters Patent—

1. In a molding-machine, the combination with a stamp, of a driving member comprising a vertically-reciprocating frame, and an electromagnet moving with said frame and adjustably mounted thereon and coacting with the stamp to raise the latter as the frame moves upward.

2. In a molding-machine, the combination with a stamp, of a driving member comprising a vertically-reciprocating frame, an electromagnet carried on said frame and moving therewith, the said electromagnet being adjustable laterally on the said frame and coacting with the stamp to raise the latter as the frame moves upward, and means for controlling the magnet and working in time with the said driving member.

3. In a molding-machine, the combination with a stamp, of a driving member comprising a vertically-reciprocating frame, an electromagnet adjustable on said frame and moving therewith, the said electromagnet coacting with the stamp to raise the latter as the frame moves upward and to release the same when the frame reaches its uppermost position, and a guide in which the stamp is loosely carried.

4. In a molding-machine, the combination with a stamp, of a reciprocating driving member, an electromagnet moving with said driving member, and coacting with the stamp, a guide in which the stamp is loosely carried, and means for carrying the guide, said means permitting the transverse adjustment of the guide, a bracket through which the stamp extends and adjustable on said driving member, the said electromagnet being carried by the said bracket and adjustable therewith to correspond with the position of the stamp.

5. In a molding-machine, the combination with a stamp, of a vertically-reciprocating driving member, a bracket adjustably mounted on said driving member and moving therewith, the stamp extending loosely through the bracket, an electromagnet carried by the bracket and means working in time with the driving member for causing the magnet alternately to attract and release the stamp.

6. In a molding-machine, the combination with a vertical tube, and a stamp fitting loosely therein, of means for driving the stamp comprising a vertically-reciprocating member, and an electromagnet adjustably mounted thereon and movable therewith, means for carrying the tube, and means for adjusting the tube laterally.

7. In a molding-machine, the combination with a vertical tube, and a stamp fitting loosely therein, of means for driving the stamp, and means for carrying the tube, said means permitting the lateral adjustment of the tube and comprising relatively adjustable parts with crossing slots therein, and a block fitted in the slots and through which the tube passes.

8. In a molding-machine, the combination of a vertical tube, a stamp fitted loosely therein, means for driving the stamp, and means for carrying the tube, said means permitting the lateral adjustment of the tube, and comprising relatively turnable parts, one having a radial slot and the other an arc-shaped slot, and in which slots the tube is fitted.

9. In a molding-machine, the combination of a stamp, a guide in which the stamp is loosely fitted, a vertically-reciprocating member, means for driving the same, a bracket adjustable on the said reciprocating member and through which the stamp passes, an electromagnet carried on the said bracket, and a switch controlling the electromagnet, the switch being driven in time with the means for driving the reciprocating member.

10. In a molding-machine, the combination with a flask, of a vertical pipe for feeding the material to the flask, a pipe-section mounted to slide on the pipe, means for sliding said pipe-section, a stamp, a guide for the stamp supported on the vertical pipe and adjustable laterally, an adjustable guide-bracket on the sliding pipe-section, and through which the stamp passes, and means on the sliding pipe-section and adjustable with the said guide-bracket for driving the stamp.

11. In a molding-machine, the combination with a flask, of a vertical pipe for feeding the material to the flask, a pipe-section mounted to slide on the pipe and forming a continuation thereof, means for sliding said pipe-section, a stamp, a guide for the stamp, the guide being supported on the said vertical pipe, an adjustable electromagnet moving with the sliding pipe-section for driving the stamp, and means for adjusting the electromagnet laterally.

12. In a molding-machine, the combination with a flask, of a vertical pipe for feeding the material to the flask, a pipe-section mounted to slide on the pipe, and forming a continuation thereof, means for sliding said pipe-section, a stamp, a guide for the stamp, the guide being supported on the said vertical pipe, and means for driving the stamp and comprising an adjustable electromagnet moving with the sliding pipe-section, and a make-and-break switch therefor driven in time with the sliding pipe-section, and means for adjusting the electromagnet laterally.

13. In a molding-machine, the combination with a flask, of a vertical pipe or tube feeding the material to the flask, a pipe-section mounted to slide on the said pipe, means for sliding said pipe-section, a stamp, a guide for the stamp supported on the said vertical pipe, means on the sliding pipe-section for driving the stamp, the said stamp-guide comprising a tube, relatively adjustable parts one having a radial slot and the other an arc-shaped slot and in which slots the tube is fitted, a rack carried by one of said parts, and a hand-shaft carrying a gear in mesh with the said rack.

14. In a molding-machine, the combination of a vertical tube, a stamp fitted loosely therein, means for driving the stamp, means for carrying the tube, said means permitting the lateral adjustment of the tube, and comprising relatively turnable parts, one having a radial slot and the other an arc-shaped slot and in which slots the tube is fitted, a rack carried by one of said relatively turnable parts, and a hand-shaft and gear, the latter being meshed with the rack.

15. In a molding-machine, the combination with a flask, of a vertical pipe feeding the material of the flask, disks carried by the pipe and having crossing slots one of said disks being adjustable relative to the other, blocks engaging the slots of the disks, vertical tubes extending through the blocks, stamps fitting loosely in said tubes, and means for driving the stamps.

16. In a molding-machine, the combination with a flask, of a vertical pipe feeding the material to the flask, a disk carried by the pipe and having radial slots therein, a second disk mounted to turn on the pipe and formed with arc-shaped slots, blocks fitted to slide in the radial slots, and having bosses engaging the arc-shaped slots, tubes extending vertically through said blocks, stamps fitting loosely in said tubes, and means for driving the stamps.

17. In a molding-machine, the combination with a flask, of a vertical pipe for feeding the material to the flask, vertical tubes, stamps fitting loosely therein, means for carrying the tubes and permitting the lateral adjustment of the same, and means for driving the stamps and comprising a pipe-section mounted to slide vertically on the feed-pipe, a disk secured to the pipe-section, guide-brackets adjustable radially on said disk, and through which the stamps extend loosely, and electromagnets carried by the brackets, means for reciprocating the tube-section and the disk carried thereby, and means for controlling the electromagnets.

18. In a molding-machine, the combination with a derrick having a hollow trunnion, of a conveyer-box carried by said derrick, an endless conveyer in said conveyer-box and passing under the hollow trunnion, a flask, and means for conducting the material from the endless conveyer to the flask.

19. In a molding-machine, the combination with a flask, of a derrick having a hollow trunnion, a conveyer-box carried by said derrick, an endless conveyer in said conveyer-box and passing under the hollow trunnion, a pipe carried by the derrick, and receiving the load of the conveyer, a stamp, and means for operating the same.

20. In a molding-machine, the combination with a vertically-turning derrick having a hollow trunnion, of a horizontally-extending conveyer-box carried by the derrick, an endless conveyer in said conveyer-box and passing under the hollow trunnion, and a gate mounted on the conveyer-box and adjustable vertically over the upper run of the endless conveyer.

21. In a molding-machine, the combination with a derrick having a hollow trunnion, of a horizontally-extending conveyer-box carried by said derrick, an endless conveyer in said conveyer-box and passing under the hollow trunnion, a gate adjustable vertically over the upper run of the endless conveyer, a stamp, a flask, and means carried by the derrick for operating the stamp, the said conveyer serving to carry the material to the flask.

22. In a molding-machine, the combination with a flask, of a derrick arranged to swing toward and from the flask, said derrick having a hollow trunnion, a conveyer carried by the derrick and passing under the hollow trunnion, a pipe carried by the derrick and receiving the load of the conveyer, the pipe feeding into the flask, a series of vertical tubes, means carried by the said pipe for supporting the said tubes and permitting the lateral adjustment of the same, a device movable vertically on the pipe, a series of electromagnets carried by said device and adjustable thereon, a series of stamps fitting loosely in said tubes and adapted to be lifted by the electromagnets when the device carrying the said electromagnets is raised, means for controlling the electromagnets, and a distributer for distributing the material into the flask.

23. In a molding-machine, the combination with a flask, of a derrick mounted to swing toward and from the flask, said derrick having a bottom trunnion, a conveyer carried by the derrick and passing under the hollow trunnion, a pipe carried by the derrick and receiving the load of the conveyer the pipe feeding into the said flask, a series of vertical guide-tubes, means carried by the said pipe for supporting said tubes and permitting the lateral adjustment of the same, a device movable vertically on the pipe, a series of electromagnets carried by said device and adjustable thereon, and a series of stamps fitting loosely in said guide-tubes and adapted to be lifted by the electromagnets, when the device carrying the said electromagnets is raised.

24. In a molding-machine, the combination with a flask, of a derrick mounted to swing toward and from the flask, a conveyer carried by the derrick, a pipe receiving the material from the conveyer and feeding it to the flask, a receiving-support having a flat upper surface on which the material is discharged, and a distributer comprising a hub and tangential arms or ribs loosely engaging the upper surface of the receiving-support.

25. In a molding-machine, the combination with a pattern and a flask or outer wall, of a distributer located over the pattern, a pipe for feeding the material, a derrick carrying said pipe and having a hollow trunnion, and an endless conveyer carried by the derrick, and passing under the hollow trunnion, the said pipe securing the material from the conveyer.

26. In a molding-machine, the combination with a revolving flask and pattern, and a distributer held stationary on the upper end of the pattern and having a central part or hub and tangential arms or ribs projecting out from said hub, and a device for holding the distributer stationary, of a derrick having a hollow trunnion, an endless conveyer carried by said derrick and passing under the hollow trunnion, a pipe carried by the derrick, and receiving the load of the conveyer, the pipe discharging the material on the upper end of the pattern, a stamp, and means for operating the same.

27. In a molding-machine, the combination with a series of vertical tubes, stamps fitting loosely therein, means for driving the stamps comprising a vertically-reciprocating member and electromagnets mounted thereon, means for carrying the tubes, means for adjusting the tubes laterally, a pattern and a flask or outer wall, means for feeding the material, and a distributer located over the pattern.

28. In a molding-machine, the combination with a revolving pattern and flask, of a distributer held stationary on the pattern and comprising a hub, arms or ribs projecting out from the hub and resting loosely on the top of the pattern, a headed bolt projecting from the top of the pattern, and a sectional block carried by the hub and loosely encircling the neck of said bolt.

29. In a molding-machine, the combination with a series of vertical tubes, stamps fitting loosely therein, means for driving the stamps comprising a vertically-reciprocating member and electromagnets mounted thereon, means for carrying the tubes and permitting of the lateral adjustment of the same, a revolving flask, means for feeding the material to the flask, a distributer for the material, and means for revolving the flask.

30. In a molding-machine, the combination with a flask, of a vertical pipe or tube for feeding the material to the flask, a pipe-section mounted to slide vertically on the pipe, links connected with the pipe-section, a lever having a forked end connected with said links, a downwardly-extending link connected with said lever, a crank with which the link is connected, means for driving the crank, a frame in the form of a disk fixed on the vertically-movable pipe-section, an electromagnet carried by the disk, a make-and-break switch controlling the magnet and connected with the crank to turn in time therewith, and a stamp working with the electromagnet.

31. In a molding-machine, the combination with a flask and pattern, of a derrick mounted to swing toward and from the flask, said derrick having hollow trunnions at its top and bottom, a vertical shaft passing through the hollow trunnion at the bottom of the derrick and extending up into the derrick, means for driving the shaft, a conveyer carried by the derrick and passing under the hollow trunnion at the top of the derrick, a horizontal arm projecting from the derrick, a vertical pipe carried by said arm and receiving the load from the conveyer, the pipe feeding into the flask, a pipe-section mounted to slide vertically on the pipe, links connected with the pipe-section, a lever having a forked end connected with said links, a downwardly-extending link connected with said lever, crank-disks with which the link is connected, a driving connection between the said vertical shaft and said crank-disks, a stamp, and means carried by the vertically-movable pipe-section for operating the stamp.

32. In a molding-machine, the combination with a flask, of a vertical pipe or tube for feeding the material to the flask, a pipe-section mounted to slide vertically on the pipe, means for sliding said pipe-section including a crank and connecting-rod, vertical guide-tubes, means carried by the pipe for supporting said tubes and permitting the lateral adjustment of the same, a frame in the form of a disk fixed on the vertically-movable pipe-section, electromagnets carried by the disk and adjustable thereon, a make-and-break switch controlling the magnets and connected with the crank to turn in time therewith and stamps fitting loosely in said guide-tubes and working with the electromagnets.

In testimony whereof we have signed our names to this specification in the presence of two subscribing witnesses.

JAMES INGHAM.
JOSEPH POULSON.
JOHN W. MOORE.

Witnesses:
EDGAR R. BECKWITH,
ARTHUR WILSON.